United States Patent [19]
Moore

[11] 3,807,154
[45] Apr. 30, 1974

[54] MEANS FOR RETRIEVING LITTER
[75] Inventor: Joseph L. Moore, Lexington, Ky.
[73] Assignee: Moore Associates, Lexington, Ky.
[22] Filed: Sept. 23, 1971
[21] Appl. No.: 182,950

[52] U.S. Cl............. 56/328 R, 214/356, 294/19 A
[51] Int. Cl.............................................. B65f 3/02
[58] Field of Search................ 294/99 R, 61, 19 A;
56/328 R, 327 R; 171/50, 52, 53, 54, 58;
214/356; 172/350, 554, 556

[56] References Cited
UNITED STATES PATENTS
2,804,336   8/1957   Thompson .......................... 294/61
3,483,687   12/1969  Tanner............................. 56/328 R
3,534,535   10/1970  Reynolds et al. ................. 56/328 R
3,623,306   11/1971  Reynolds et al. ................. 56/328 R
1,859,980   5/1932   Mueller............................ 56/328 R
2,599,715   6/1952   Lepper............................. 56/328 R
3,451,488   6/1969   Taketa............................. 171/53 X
2,539,596   1/1951   Smith.............................. 56/328 R
1,879,905   9/1932   Liebfried......................... 56/328 R Primary Examiner—Evon C. Blunk
Assistant Examiner—Johnny D. Cherry
Attorney, Agent, or Firm—Wood, Herron & Evans

[57] ABSTRACT

Litter retrieving means comprising an array of fingers which become independently biased with a holding pressure upon engaging the litter article and which is particularly suited for retrieving cans and bottles, is disclosed. Hand manipulated tools and vehicular apparatus are illustrated as examples of the adaptability of the invention in retrieving litter from paved surfaces, from beaches, or from grass covered ground.

6 Claims, 9 Drawing Figures

PATENTED APR 30 1974

INVENTOR
JOSEPH L. MOORE

BY  *W. E. Sherwood*

ATTORNEY

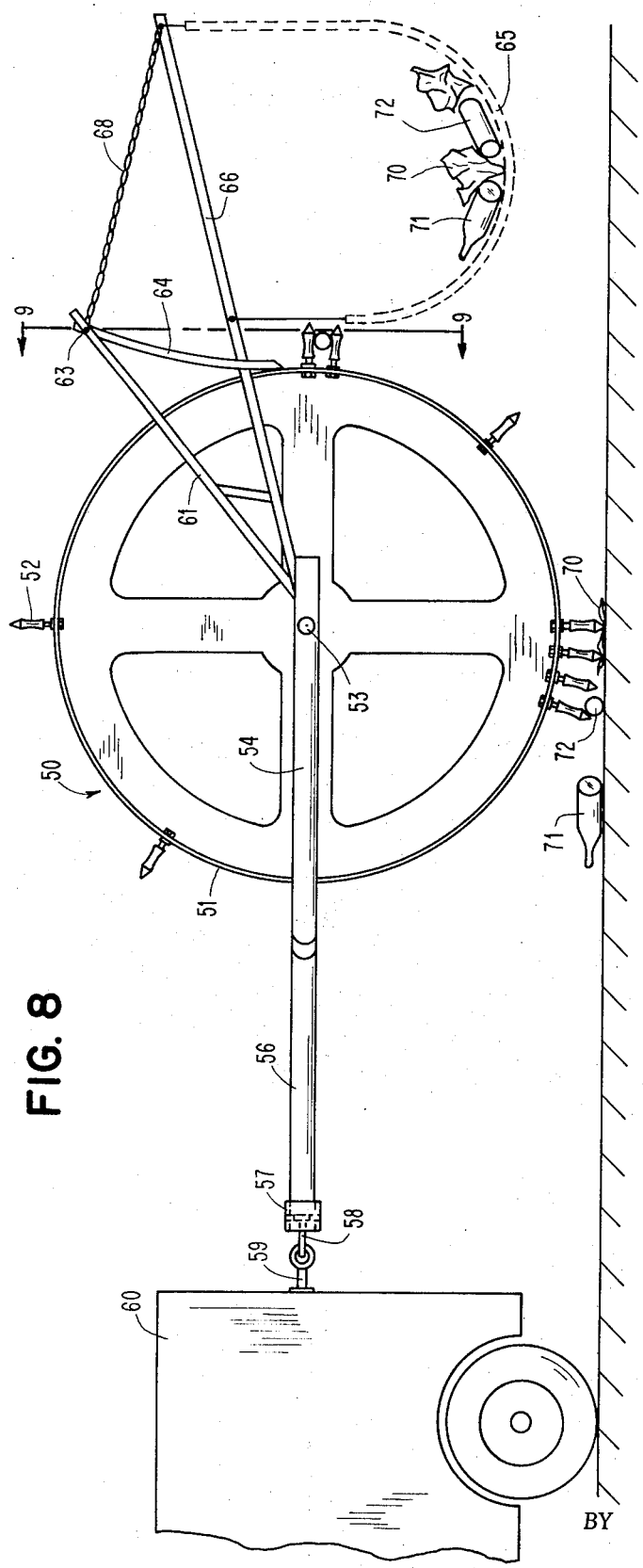
FIG. 8
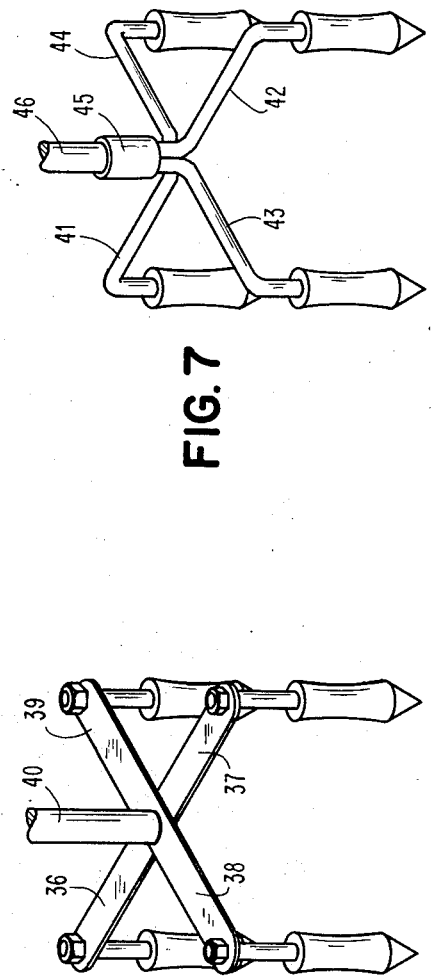
FIG. 7
FIG. 6
INVENTOR
JOSEPH L. MOORE
BY W. E. Sherwood
ATTORNEY 3,807,154

MEANS FOR RETRIEVING LITTER

BACKGROUND OF THE INVENTION

Conventional practices of packaging consumable commodities, together with lack of discipline on the part of the user of the commodity as regards disposing of the packaging materials, have given rise to the problem of retrieving and making an orderly disposition of the used packaging materials. This problem is particularly noticeable in locations where groups of people have been present, as for example in supermarket areas, along beaches, along heavily travelled highways, or the like. As a result, this largely unnecessary problem has been attacked by employing workers to pick up the used materials by hand; or by means of tools; or by sweeping and conveying such materials into a trash container by means of a towed or self-propelled vehicle. Obvious disadvantages are present, however, in such methods of litter removal.

Practical considerations, moreover, have largely limited the most effective retrieval of such litter to manual operation since the litter often becomes embedded in high grass or soft ground (as along highways), or in sand (as along beaches). Another consideration involves the shape of the litter and, as known, cans and bottles form a significant proportion of that litter. Not only must the retrieving means avoid breakage of a glass container, but it must be capable of engaging the article rapidly, and then holding the article securely during the lifting movement to a disposal location. Articles such as beverage bottles and cylindrical soft drink cans, for example, are normally difficult to retrieve since they tend to skid when first contacted by the retrieving device; since when wet they can easily slip from the retrieving device after being engaged thereby, and since the random fashion in which they may be located on or in the ground, and the wide variety of their shapes and sizes, make it difficult to obtain a firm engagement and satisfactory holding action by the retrieving device.

In addition, such litter also may comprise puncturable material such as paper, textile, used milk cartons, cups, or the like, and a satisfactory retrieving means also should possess the capability of engaging flat materials of this nature while simultaneously being used for retrieval of bottles, cans and objects having arcuate outer surfaces of form-retaining nature.

It is these and other disadvantages of conventional methods and apparatus for retrieving litter which it is a purpose of this invention to overcome.

SUMMARY OF THE INVENTION

The invention is directed toward a more efficient and less laborious method of retrieving miscellaneous, randomly disposed, litter by means of improved apparatus which employs an array of spaced fingers and for each of which a separately applied spring biased holding pressure becomes effective when the finger engages the litter article. The finger is adapted to cam arcuately shaped articles into a position in which the spring pressure is effective and in conjunction with one or more corresponding fingers to hold the article while it is transported to a disposal location.

Among the objects of the invention are the provision of an improved litter retrieving means adapted to remove cans and bottles from soft or grass covered ground, from beaches, or from paved surfaces with substantially equal facility; the provision of a litter retrieving means which retrieves glass articles without breaking the same; the provision of a litter retrieving means requiring less exertion on the part of the user; the provision of an inexpensive hand manipulated litter retriever; the provision of a vehicular litter retriever capable of moving at substantial speed while effecting an efficient retrieval of miscellaneous, randomly disposed litter; and the provision of an improved finger construction for use with litter retrieving apparatus.

These and other objects and advantages of the invention will become more apparent as the description proceeds and when considered in conjunction with the accompanying drawings in which FIG. 1 is a perspective view of one form of hand-held retrieving means showing a cylindrical can engaged thereby.

FIG. 6 is a perspective view showing another form of retrieving means employing spring leafs.

FIG. 7 is a perspective view showing another form of retrieving means employing spring wires.

FIG. 8 is a side elevation view of one form of apparatus for employing the invention in a vehicular usage, (parts of the assembly being omitted in the interest of clarity)

Figure 1:
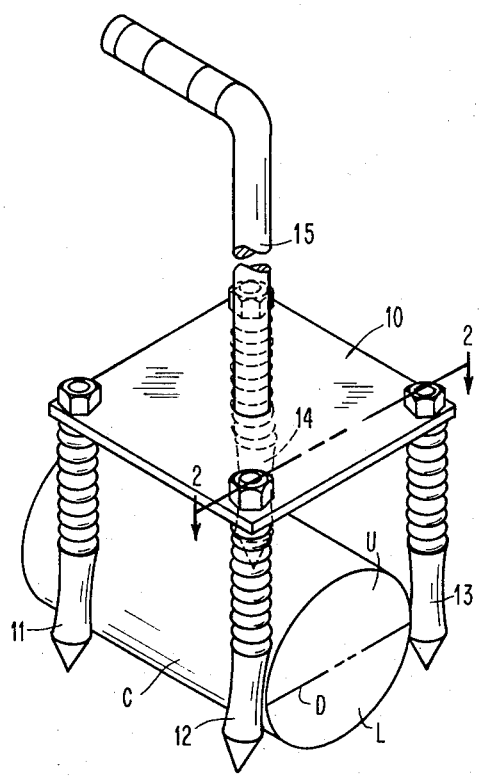
Figure 2:
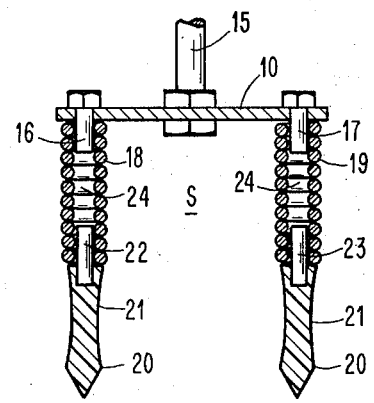
FIG. 2 is a sectional view on line 2—2 of FIG. 1 to a larger scale and showing the normal position of two of the fingers.

Referring now to FIGS. 1 and 2 one form of apparatus suitable for manual operation includes a rigid plate 10 serving as a supporting means for a plurality of article-engaging fingers, here shown at 11 to 14 and with a handle 15 attached to the upper portion of the plate. Downwardly extending metallic studs, as seen at 16, 17, are attached to the plate in a substantially uniformly spaced array and helical springs, as seen at 18, 19, are attached at their upper ends to these studs. As a signficant feature of the invention each of the fingers includes a specially shaped body portion which preferably, but not necessarily, is formed of a resilient material with a high coefficient of friction with respect to glass or metal, such as Neoprene.

This body portion includes a conically shaped lower end forming a camming surface with a maximum diameter as at 20 and having an arcuate longitudinally extending concave article-holding surface 21 extending to the upper end of the body portion, and terminating in a circular rim of a diameter less than that of the lower end at 20 but greater than that of the central region of said article-holding surface. No portion of this surface or neck 21 has a diameter equal to or greater than the diameter at 20. At its upper end the body portion is provided with upwardly projecting metallic studs, as seen at 22, 23, to which the lower ends of the springs are attached and with the springs having an unconfined central region 24 between the points of attachment to the several studs. Accordingly, a spring biased holding pressure is applied to each finger independently of the other fingers when that one finger contacts an article to be retrieved. When therefore the apparatus of FIG. 1 is lowered to bring finger 12 for example, into contact with the can C having a diameter D, the cam portion of the finger 12 slips over the can to bring the maximum diameter of that cam into contact with a lower portion L of the can and simultaneously the concave surface of the finger moves into contact with an upper portion U of the can. The same action of course, is occuring with respect to any of the corresponding fingers touching the can, and each such finger is under a spring biased pressure due to the deflection of its spring upon the finger encompassing the can. The result of this spring bias is to cause the can to be held securely during the movement of the loaded retrieval means to a point of disposal for the litter.

As will be understood, the can or bottle will be lying on or embedded in a surface (herein generally called the ground) in random fashion and there is no assurance that any given number of fingers will be brought into contact with such article, nor is it necessary that any particular one of the array of fingers be used. In some cases not more than two fingers will suffice to perform the task while in other situations three, four or even more fingers will be used. The open space S (FIG. 2) below plate 10 is sufficient to contain quite large articles of litter without causing contact of that plate with the article and correspondingly the unconfined central portions 24 of the springs are long enough to provide for suitable lateral deflection of the fingers to engage such large cans or bottles. The overall length of the finger moreover is such as to permit the lower conical portion of the finger to penetrate well into the ground, or sand, thus to engage objects which may be embedded therein.

Figures 3, 5:
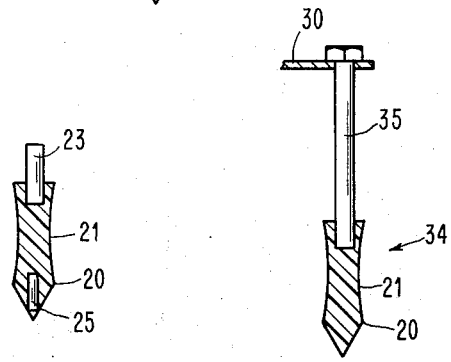
FIG. 3 is a sectional view of a modified finger especially adapted for puncturing purposes.
FIG. 5 is a sectional view on line 5—5 of FIG. 4 to a larger scale and showing the normal position of the finger.
Figure 9:
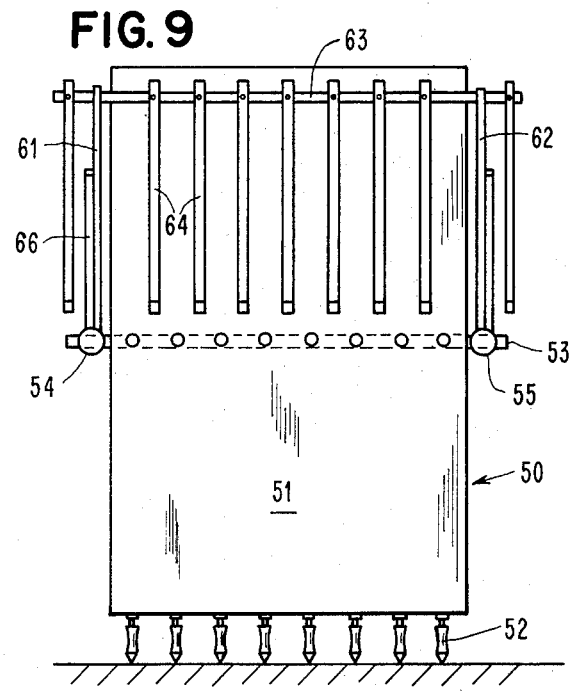
FIG. 9 is an end elevation view of the apparatus as seen along line 9—9 of FIG. 8.

For the purpose of penetrating litter such as used milk cartons the several fingers may be provided at the lower end of their cam portions with an embedded metallic punch or spike 25 as seen in FIG. 3. This punch while serving to penetrate paper of the like will nevertheless glance off a bottle surface without breaking the bottle.

Figure 4:
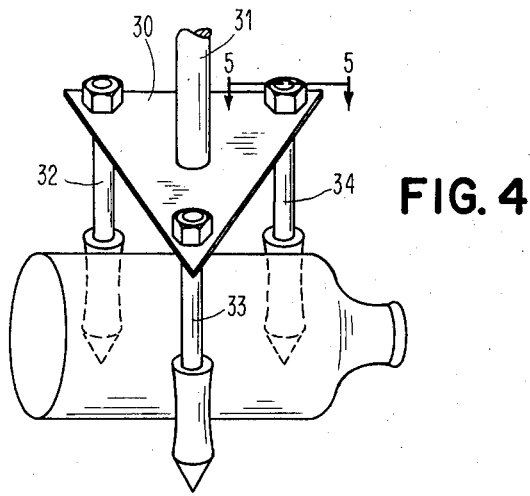
FIG. 4 is a view similar to FIG. 1 and showing a second form of retrieving means with a bottle engaged thereby.

Various other forms of the hand held version of the invention may be employed and as seen in FIG. 4 a triangular plate 30 of spring steel, adapted to flex under a sufficient loading, serves jointly as the supporting means for the fingers and as a spring bias means. A handle 31 is attached at the central region of the plate and fingers 32, 33 and 34 are attached to the plate at its apex. A rigid stud 35 attached to the plate extends downwardly and is embedded at its lower end in the finger body which has the conically shaped cam and concave longitudinally extending upper portion as above described.

In lieu of a flexible plate, interacting leaf springs may be employed as indicated in FIG. 6 and in which a pair of leaves having arms 36, 37 and 38, 39 respectively are rigidly joined at their midsections to a handle 40. At the extreme ends of each leaf the finger assembly of FIG. 5 may be fastened to serve the above described litter retrieval purpose. Still another version may employ a grouping of spring wires, 41 to 44, as seen in FIG. 7, having their inner ends housed in a bushing 45 to which the handle 46 is attached. At their distal ends these wires support a finger assembly of the type shown in FIG. 5.

Although the invention as above described can be used with a hand held retrieving means, it is particularly suited for use with a vehicular apparatus capable of travelling at substantial speeds, for example as much as 7 miles per hour and served by a single operator. Various combinations of such apparatus having an endless array of fingers on a travelling support and involving a ground-engaging drum as shown, or a conveyor belt (not shown), and either towed by a prime mover (as shown) or pushed by a prime mover (not shown) may be used. As an example, a drum 50 having a peripheral casing 51, to which an endless array of fingers 52 of the type shown in FIGS. 1 and 2 are secured, is provided with an axle 53 supported upon yoke arms 54, 55 of the framework and with an extension 56 of the yoke having a conventional coupling 57 permitting rotational movement of the yoke in a first plane. This coupling in turn is engaged with another coupling 58 permitting rotation of the first coupling in a plane normal to the first plane, and the second coupling is mounted on a rigid pintle 59 attached to a prime mover 60. The width dimension of the drum is sufficient to give stability thereto when moving on laterally sloping ground, and similarly articulated drums disposed to the sides of the central drum may be towed, or pushed by the same prime mover in the manner of ganged mowers, if desired.

At the trailing portion of the drum the framework mounting the axle of the travelling drum includes arms 61, 62 attached at their lower ends to the yoke arm and at their upper ends to a transverse support 63. Extending downwardly from support 63 is a plurality of strippers 64 lying in planes between the rows of fingers of the drum and with their lower ends substantially tangential to the drum casing. Preferably these strippers are formed of a resilient form retaining material. Accordingly, as the drum rotates to bring entrapped litter to these strippers, the litter is disengaged by the lower ends of the strippers and is flipped outwardly. For the purpose of holding the thus collected litter any suitable means such as a trailing wagon towed by the drum, or a basket, as shown, carried by that drum, may be used.

Conveniently, a mesh type basket 65 suspended from laterally spaced arms 66, 67 of the framework and having an upper portion 68 to intercept and to direct downwardly into the basket any litter being thrown from the fingers of the drum, is employed.

The operation of the described vehicular apparatus will be self-evident since as the drum rotates into contact with a puncturable piece of litter 70 lying on the ground, or into contact with a bottle 71 or can 72, the respective fingers 52 engage that litter, secure it in place, and carry it to the strippers. Upon being stripped from the fingers the litter then is trapped in the basket, and in time may be transferred therefrom for final disposal.

Obviously, many modifications and variations of the present invention are possible in the light of the above disclosure. It is, therefore, to be understood that within the scope of the appended claims the invention may be practiced otherwise than as specifically described.

What is claimed is:

1. Litter retrieving means for removing beverage bottles, cans and paper lying in random positions on the ground, comprising, a generally cylindrical drum having a peripheral surface, framework mounting said drum for rotation about a horizontal axis for moving said drum across the ground, an array of fingers mounted in spaced rows around said drum for movement in unison therewith when said drum rotates about said axis, each said finger projecting outwardly from the said peripheral surface and having an outer end passing proximate to the ground surface as the drum rotates about said axis, each finger being relatively short in relation to the diameter of the drum and being resiliently deflectable transversely of its longitudinal axis, each finger having a conical camming surface adjacent its said outer end and an article-holding surface radially inward of said camming surface for gripping articles such as bottles and cans, the article-holding surface presenting a concave neck having a minimum diameter less than the maximum diameter of said camming surface, said concave neck increasing in diameter radially inwardly of said minimum diameter, a spring associated with each finger, whereby each finger is resiliently deflectable transversely of its axis, said spring comprising a coil spring by which said finger is connected to said drum, a pointed hard spike projecting outwardly beyond said camming surface for piercing paper and the like, means carried by said framework and projecting between the rows of fingers for dislodging articles from said fingers and spikes, and means attached to said framework for receiving and carrying articles dislodged from said fingers and spikes.

2. Litter retrieving means for removing beverage bottles, cans and paper lying in random positions on the ground, comprising, a generally cylindrical drum having a peripheral surface, framework mounting said drum for rotation about a horizontal axis for moving said drum across the ground, an array of fingers mounted in spaced rows around said drum for movement in unison therewith when said drum rotates about said axis, each said finger projecting outwardly from the said peripheral surface and having an outer end passing proximate to the ground surface as the drum rotates about said axis, each finger being relatively short in relation to the diameter of the drum and being resiliently deflectable transversely of its longitudinal axis, each finger having a conical camming surface adjacent its said outer end and an article-holding surface radially inward of said camming surface for gripping articles such as bottles and cans, the article-holding surface presenting a concave neck having a minimum diameter less than the maximum diameter of said camming surface, said concave neck increasing in diameter radially inwardly of said minimum diameter, a spring associated with each finger, whereby each finger is resiliently deflectable transversely of its axis, said spring comprising a flexible mounting to which the finger is attached, a pointed hard spike projecting outward beyond said camming surface for piercing paper and the like, means carried by said framework and projecting between the rows of fingers for dislodging articles from said fingers and spikes, and means attached to said framework for receiving and carrying articles dislodged from said fingers and spikes.

3. Litter retrieving means for removing beverage bottles, cans and paper lying in random positions on the ground, comprising, a generally cylindrical drum having a peripheral surface, framework mounting said drum for rotation about a horizontal axis and for moving said drum across the ground, an array of fingers mounted around said drum for movement in unison therewith when said drum rotates about said axis, each said finger projecting outwardly from the said peripheral surface and having an outer end contacting the ground surface as the drum rotates about said axis, each finger comprising a rigid stud having an inner end fastened to said drum and an outer end embedded in a body which projects outwardly beyond said stud, said body molded from a resiliently flexible material such as rubber so as to be deflectable with respect to said stud, said body having a conical camming surface adjacent an outer end thereof and an article-holding surface inward of said camming surface for gripping articles such as bottles and cans, the article-holding surface presenting a concave neck having a minimum diameter less than the maximum diameter of said camming surface, said concave neck leading inwardly toward a shoulder formed on said body, said shoulder having a diameter greater than said minimum diameter thereby resisting deflection of said body adjacent said stud, said stud being of smaller diameter than said shoulder, and a narrow, rigid pointed spike secured in said body at the outer end thereof, said spike projecting outwardly beyond said camming surface for piercing paper and the like, each finger being relatively short in relation to the diameter of the drum, means carried by said framework and projecting between the fingers for dislodging articles between said fingers or pierced by said spikes, and means attached to said framework for receiving and carrying articles dislodged from said fingers and spikes.

4. Apparatus as defined in claim 3 including a coupling means for connecting said framework to propelling means and adapted to accommodate the passage of the litter retrieving means over non-uniform ground surfaces.

5. The litter retrieving means of claim 3 wherein said fingers are spaced apart by distances such that when the camming surfaces of two adjacent fingers contact a bottle, the said fingers are resiliently sprung apart by the bottle sufficiently that the bottle moves relatively past the camming surfaces of the two fingers and is gripped between the article-holding surfaces of the two fingers.

6. The litter retrieving means of claim 3 wherein said framework is adapted to be moved over said ground with the spikes in contact with the ground surface.

* * * * *